(No Model.)

W. A. CONNER.
ELECTRIC CABLE.

No. 452,341.　　　　　　　Patented May 12, 1891.

WITNESSES:
Darwin S. Wolcott
F. E. Gaither

INVENTOR,
William A. Conner
by George H. Christy
Att'y.

UNITED STATES PATENT OFFICE.

WILLIAM A. CONNER, OF PITTSBURG, PENNSYLVANIA, ASSIGNOR TO THE STANDARD UNDERGROUND CABLE COMPANY, OF SAME PLACE.

ELECTRIC CABLE.

SPECIFICATION forming part of Letters Patent No. 452,341, dated May 12, 1891.

Application filed July 24, 1890. Serial No. 359,716. (No model.)

*To all whom it may concern:*

Be it known that I, WILLIAM A. CONNER, a citizen of the United States, residing at Pittsburg, in the county of Allegheny and State of Pennsylvania, have invented or discovered certain new and useful Improvements in Electric Cables, of which improvements the following is a specification.

The invention described herein relates to certain improvements in the manufacture of electric cables, and has for its object the production of a cable of low static capacity, especially adapted for telephone service.

The invention is hereinafter more fully described and claimed.

Figure 1:
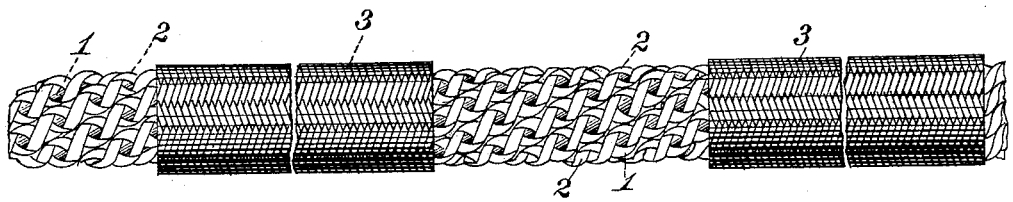
Figure 2:
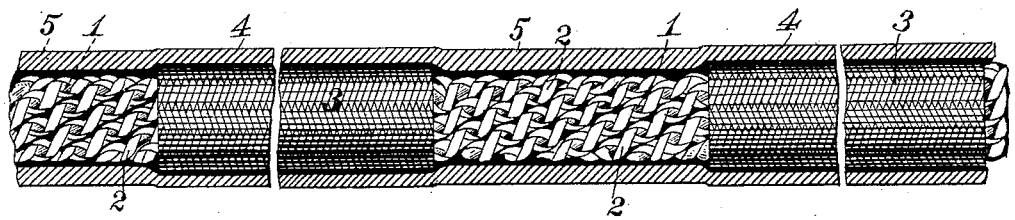

In the accompanying drawings, forming a part of this specification, Figure 1 is a view in side elevation of a portion of the core, and Fig. 2 is a sectional elevation of a portion of the completed cable.

In the practice of my invention the wires or conductors 1 are covered to any desired thickness and in any of the usual ways with cotton, jute, hemp, paper, or other fibrous material. This fibrous material 2 may be applied so as to form a close compact covering, or preferably so as to be comparatively loose—i. e., having openings or interstices therein. The covered wires are then laid up together in any suitable manner and to any desired number, and then inclosed by a covering or wrap 3 of cotton tape, paper, or other material, so applied as to prevent the penetration of the sealing material under normal conditions through the covering or wrapping 3. At the ends of each length or section of cable and at suitable points between the ends this covering 3 is omitted or cut away for a distance of two or three feet, more or less, for the purpose to be hereinafter stated. After the core has been thus prepared one end is passed through the hollow core-bar of a lead-press, and the core-bar is filled with a suitable sealing material, as paraffine, resin, oil, rubber compounds, &c. The press is then started and the lead pressed around the core. While the end and intermediate portions of the core from which the wrapping or covering has been removed, as stated, the press is so adjusted that the lead is pressed tightly against the core, thereby compressing the wires into a compact bundle. As the sealing material will readily flow in between and around the wires of the denuded portions, the compacting of the wires together by the lead in the manner stated will form an air and water tight section at such portions, the sealing material impregnating the covering 2 of the wires and filling all spaces between them. While applying the lead to the portion of the cable intermediate between the seals 5, formed as above stated, the press is so adjusted that the lead covering or sheath 4 will be comparatively loose, thereby affording a space between the lead sheath and the covering or wrapping 3 for the sealing material 6, which will flow from the previously-charged core-bar. By this method of manufacturing the cable air is inclosed by the sealing material within the core, and is prevented by the seals 5 from escaping at the ends and also prevented from escaping from the entire length of the cable in case of a rupture at any point.

I claim herein as my invention—

1. In an electric cable, the combination of a series of two or more wires covered with fibrous material, a closely-laid wrapping surrounding said wires, said wrapping being omitted at suitable points along the length of the cable, a sealing material surrounding the wrapping and impregnating and filling the core at the points of omission of the wrapping, and a lead sheath, said sheath being compressed around the core where the same is impregnated with the sealing material, substantially as set forth.

2. As an improvement in the art of manufacturing electric cables, the herein-described method, which consists in covering each wire with a fibrous material, covering a series of two or more wires in a core by a closely-laid wrapping so applied as to leave certain portions of the core uncovered, applying a sealing material to the core, said sealing material entering the portions of the core unprotected by the wrapping, applying a lead sheath to the core, and causing said sheath to compress the portions of the core unprotected by the wrapping, substantially as set forth.

In testimony whereof I have hereunto set my hand.

WILLIAM A. CONNER.

Witnesses:
W. B. CORWIN,
DARWIN S. WOLCOTT.